US006726163B2

(12) United States Patent
Eppard et al.

(10) Patent No.: US 6,726,163 B2
(45) Date of Patent: Apr. 27, 2004

(54) HUNTER'S SHOOTING REST AND METHOD OF USING SAME

(76) Inventors: William M. Eppard, 785 Atkinson Rd., Christianburg, VA (US) 24073; Thomas J. McMurray, 9300 Davis Dr., Lorton, VA (US) 22079

( * ) Notice: Subject to any disclaimer, the term of this patent is extended or adjusted under 35 U.S.C. 154(b) by 0 days.

(21) Appl. No.: 09/938,723

(22) Filed: Aug. 27, 2001

(65) Prior Publication Data

US 2003/0038218 A1 Feb. 27, 2003

(51) Int. Cl.[7] .............................................. A47B 96/00
(52) U.S. Cl. ......................... 248/219.4; 182/87; 42/94
(58) Field of Search .......................... 248/219.4; 42/94; 182/187

(56) References Cited

U.S. PATENT DOCUMENTS 1,722,402 A * 7/1929 Veilleux ..................... 182/187
2,630,288 A * 3/1953 Eubanks ..................... 248/118
5,491,920 A * 2/1996 McCullers ..................... 42/94
5,685,103 A * 11/1997 Wiggins ....................... 211/64
5,723,808 A * 3/1998 Devall ..................... 248/124.1
5,769,372 A * 6/1998 Klosterman .............. 248/217.3
5,819,463 A * 10/1998 Amos ............................. 42/94

* cited by examiner

Primary Examiner—Alvin Chin-Shue
(74) Attorney, Agent, or Firm—Breiner & Breiner, L.L.C.

(57) ABSTRACT

A shooting rest for supporting a firearm while a hunter is hunting from a tree stand, a tree seat, a ground blind or a field, including a mounting bracket and an arm pivotally attached thereto to allow horizontal aiming adjustment having a pair of forks from which a cradle is supported for resting a firearm therein. Vertical aiming adjustment is allowed by swinging the firearm forward or backward within the cradle and/or adjusting the cradle along the fore-end of the stock of the firearm.

9 Claims, 5 Drawing Sheets

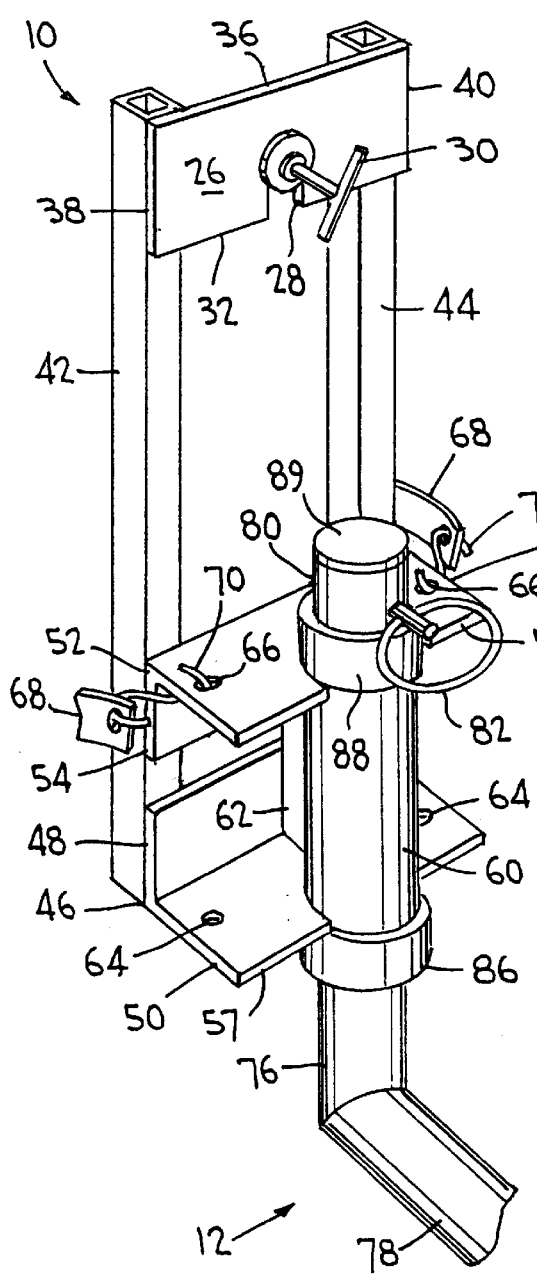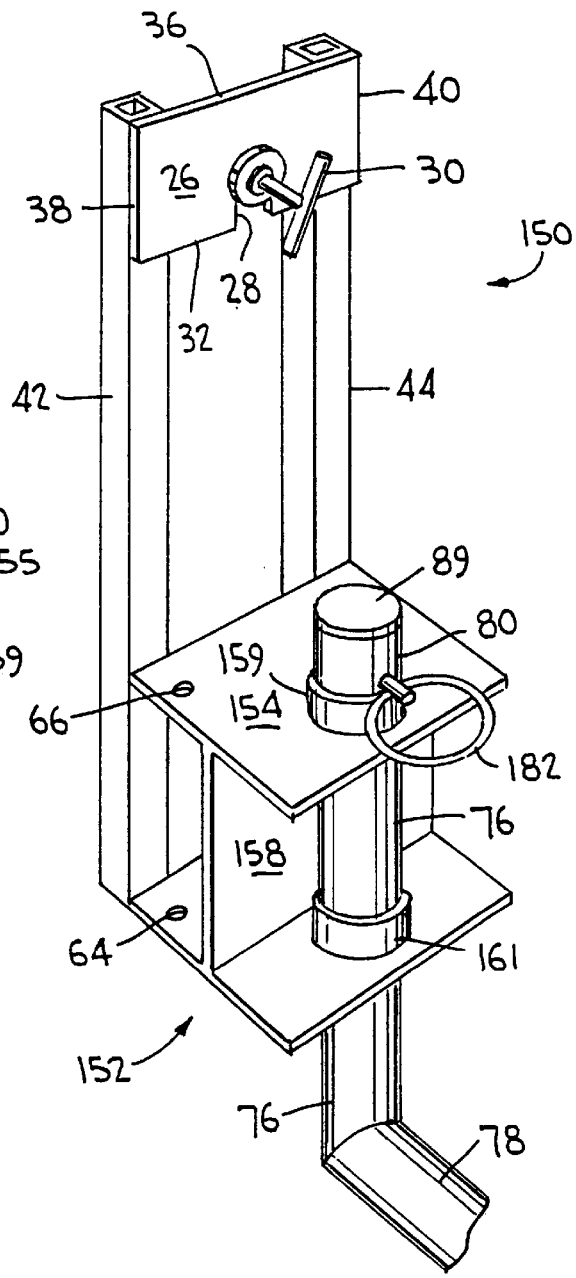

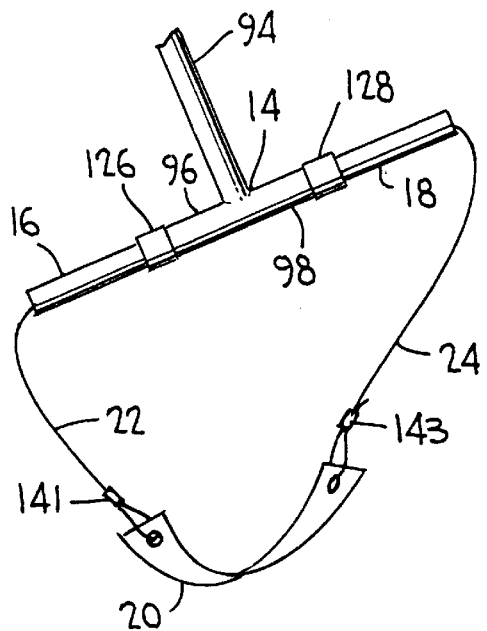
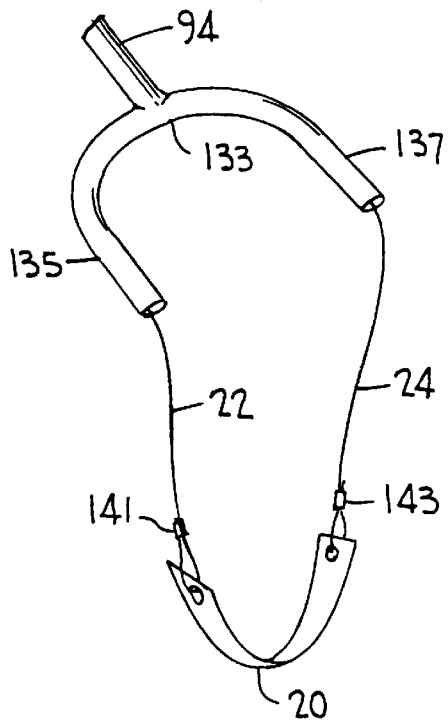
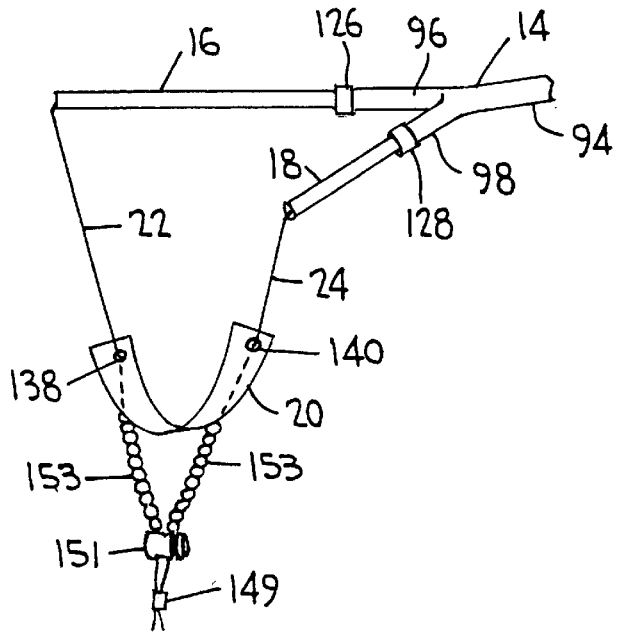

HUNTER'S SHOOTING REST AND METHOD OF USING SAME

FIELD OF THE INVENTION

The present invention relates to a device for providing a stable platform for selected devices, e.g. firearms, camera lenses, etc. More particularly, the invention relates to a shooting rest for supporting a firearm of a hunter while hunting from a tree stand, a tree seat, a ground blind or a field.

BACKGROUND OF THE INVENTION

Portable tree stands, tree seats and ground blinds provide advantages in terms of concealment and comfort while awaiting the appearance of game and during the process of following an animal with a firearm during aiming and shooting. In particular, portable tree stands provide an improved vantage point when hunting various game, such as deer and other big game species. The elevated position reduces human odor near the ground which can alert potential game of the hunter's presence. Further, the elevated position allows a hunter more movement while hunting without alerting potential game to the hunter's location.

Since hunters may travel long distances and over rough terrain in search of game, it is important that the hunter's tree stand or other accessories the hunter may use be highly portable, i.e. lightweight and compact. One accessory which can increase a hunter's chances of killing game when using a tree stand or the like is a shooting rest for supporting a firearm while the firearm is being aimed. It is well known that when aiming a firearm at a target or the like, accuracy is increased if the firearm is rested against a platform or support.

Bench-style hunting rests are well-known and typically consist of a bench configuration with an adjustable firearm rest which provides support for a hunter's forearm and stock of the firearm. However, it is not practical for a hunter to lug a bench-style shooting rest into the field and over great distance given the weight and unwieldiness of bench-style shooting rests on the market today. Bipod and monopod-style shooting rests are also known but are not practical for use with tree stands because there is no suitable platform on which to place the pod.

Additionally, it is known to provide a tree stand with a rail-type shooting rest. The rail comprises a horizontal bar upon which a hunter can place a firearm when aiming and firing the firearm. However, because of their size, configuration and weight, rail-type shooting rests are not conducive to portability, nor do they provide adequate horizontal or vertical sight adjustment. Moreover, rail-type shooting rests are not readily collapsible and therefore cannot be folded into a compact size.

In response to the shortcomings of known shooting rests, alternate devices have been devised which are more portable than those described above. For example, U.S. Pat. No. 5,685,103 to Wiggins describes a device for supporting a gun by the scope when aiming. The device includes a base plate, an arm pivotally attached to the plate and a strap for securing the base plate to a tree. Positioned at the outward end of the arm, opposite the base plate, is a downwardly extending ring. An elastic member extends down from the ring which has a pair of harnesses attached at opposite ends thereof which hang loosely therefrom. In use, a firearm is held by its scope by loops formed in the harnesses.

Although more portable than conventional shooting rests, the Wiggins device possesses several shortcomings. Most obvious are the fairly limited vertical sight adjustment afforded thereby and the inability to dampen side-to-side, or left-to-right, movement of a firearm suspended therein. The latter is due to the device's reliance on a single suspension means suspended from a single arm, specifically, the suspension of the elastic member from the arm. Furthermore, the additional time and work required to position a firearm in the device is not desirable to most hunters. Additionally, because the device is not designed for use with a firearm that does not include a scope, the device cannot be used by hunters who rely on iron sites only or shotguns.

Similarly, U.S. Pat. No. 5,723,808 to Devall describes an adjustable gun rest which can be secured to a tree when hunting. The gun rest includes a V-shaped base plate and mounting strap for securing the gun rest to a tree. A primary support is rigidly attached to the base plate extending out from the tree, and a secondary support member is pivotally attached to the primary support member such that the secondary support member can be moved in a vertical direction. A resting means, such as a hook-shaped section, is connected to the free end of the secondary support member to allow a firearm or the like to be rested thereon. However, because the attachment of the primary support to the secondary support member is limited to vertical movement, a hunter using the gun rest is particularly limited in the horizontal plane with respect to sight adjustment.

The present invention provides an improvement over conventional hunter's shooting rests, including those specifically described above, by alleviating the shortcomings of known shooting rest systems. Thus, the present invention is highly portable, provides support for a firearm, and allows for smooth and continuous tracking with the firearm of moving game while maintaining maximum sight adjustment when aiming a firearm at game.

OBJECTS AND SUMMARY OF THE INVENTION

A primary object of the invention is to provide a hunter's shooting rest that is lightweight and configured so as to be easily portable.

A further primary object of the invention is to provide a hunter's shooting rest having a suspended cradle for supporting a firearm in a semi-ready position so as to minimize potentially game alerting motion by a hunter when sighting in game and for supporting a firearm when aiming and firing the firearm.

A further primary object of the invention is to provide a hunter's shooting rest that allows for unhindered and continuous horizontal and vertical sight adjustment when aiming a firearm supported thereby.

Another object of the invention is to provide an effective method of supporting and aiming a firearm from a tree stand, a tree seat, a ground blind or a field.

The objects of the invention are accomplished by providing a hunter's shooting rest having a mounting bracket and an arm pivotally attached thereto, the arm including a two armed branched portion, preferably a Y-shaped portion, from which a cradle adapted to accommodate a firearm is adjustably and swingably suspended.

The mounting bracket includes at its upper end a mounting plate having an opening, preferably a slot, through which a T-screw can be inserted and driven into a tree, or other suitable structure, for securing the shooting rest to the tree. Connected to the mounting plate by a pair of downwardly extending posts, are a pair of horizontally arranged right-angled brackets. A pair of openings for receiving the ends of a strap adapted to wrap around and fit snugly against the tree are located in each bracket. The T-screw and strap together provide a stable means of anchoring the shooting rest to the tree.

The arm is pivotally attached to the mounting bracket by inserting a vertical portion of the arm into a cylinder vertically arranged within a pair of aligned, semi-circular recesses in the forward facing outward edges of the respective right-angled brackets. A pin is inserted through two aligned openings in an upper end of the vertical portion of the arm that protrudes through the cylinder. This arrangement secures the arm to the mounting bracket and allows the arm to pivot or swing freely in a horizontal plane for smooth and continuous tracking with a firearm of moving game and horizontal sight adjustment when aiming a firearm. The arc of the pivot is limited only by the size of the tree, i.e. the arm will pivot left or right until it hits the body of the tree.

The branched portion, described in the preferred embodiment as a Y-shaped portion, of the arm further includes a detachable Y-shaped connector having a base portion which is inserted into the horizontal portion of the arm and a pair of branches integrally attached to the base portion. Inside the base portion there is situated a spring-biased button of a snap button arrangement for securing the base portion to the arm, preferably in a telescoping arrangement. The button interacts with a series of holes in the horizontal portion of the arm thereby allowing the base portion to be secured to the arm at different points. Thus, the total horizontal length of the arm can be adjusted to suit a particular hunter's requirements.

A fork is attached to each respective branch, preferably in a telescoping arrangement, of the Y-shaped connector and secured thereto using a snap button arrangement identical to the one used to secure the base portion of the Y-shaped connector in the arm. Suspended between the forks by a flexible elongated material, such as a cord, is a cradle structured to accommodate and support a firearm between shots and when following moving game during aiming the firearm at game. Due to the loose or movable suspension of the cradle, a hunter using the shooting rest can support the firearm between shots and quickly have the firearm in position for a shot with minimal movement.

Once the firearm is in place within the cradle, adjustment of vertical sighting is easily effected by rocking the firearm forward and/or sliding the cradle forward on the fore-end of the stock or barrel for longer shots and rocking the firearm backward and/or sliding the cradle rearward on the fore-end of the stock or receiver for shorter shots. Vertical sight adjustment can further be modified by adjusting the length of the cord securing the cradle to the respective forks as specifically described hereinafter. Likewise, horizontal adjustment or tracking movement is easily effected by pivoting the arm within the cylinder of the mounting bracket simply by maneuvering the firearm supported therein right to left. Thus, smooth and continuous aiming at game in the vertical plane and the horizontal plane is allowed by maneuvering the firearm within the cradle without having to directly adjust the shooting rest itself.

BRIEF DESCRIPTION OF THE DRAWINGS

FIG. 4 is a perspective view of a mounting bracket for a hunter's shooting rest in accordance with the preferred embodiment of the present invention.

FIG. 5 is a perspective view of a portion of a pivot arm illustrating forks arranged to form a 180 degree angle in accordance with an alternative embodiment of the present invention.

FIG. 6 is a perspective view of a portion of a pivot arm illustrating a U-shaped portion in accordance with an alternative embodiment of the present invention.

FIG. 7 is a perspective view of a portion of a pivot arm illustrating an alternative embodiment for adjusting the distance between a cradle suspended from the pivot arm and the pivot arm itself.

FIG. 8 is a perspective view of a second embodiment of a mounting bracket for a hunter's shooting rest in accordance with the present invention.

DETAILED DESCRIPTION AND PRESENTLY PREFERRED EMBODIMENTS

Figure 1:
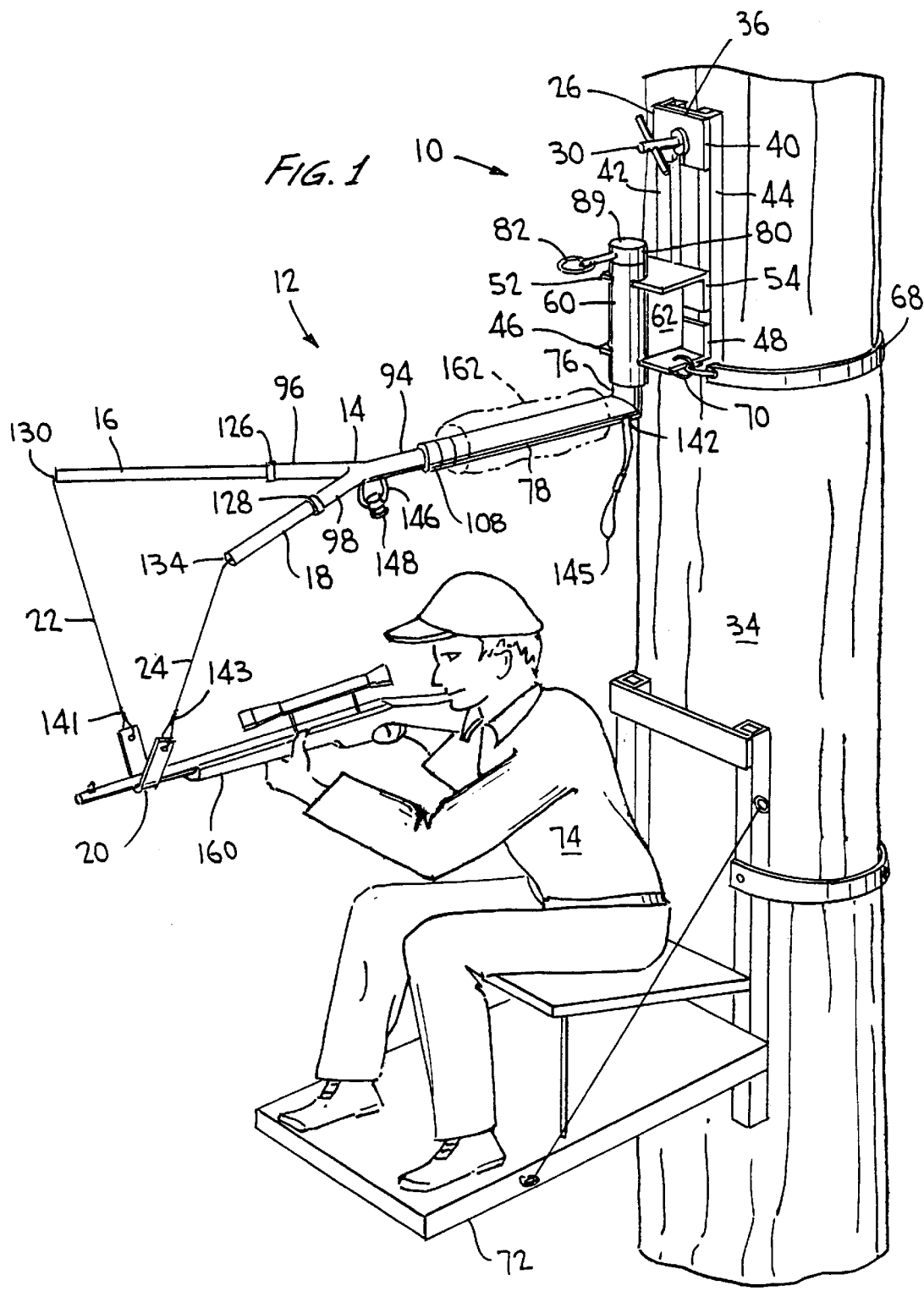
FIG. 1 is a perspective view of a hunter using a hunter's shooting rest in accordance with a preferred embodiment of the present invention.
Figure 2:
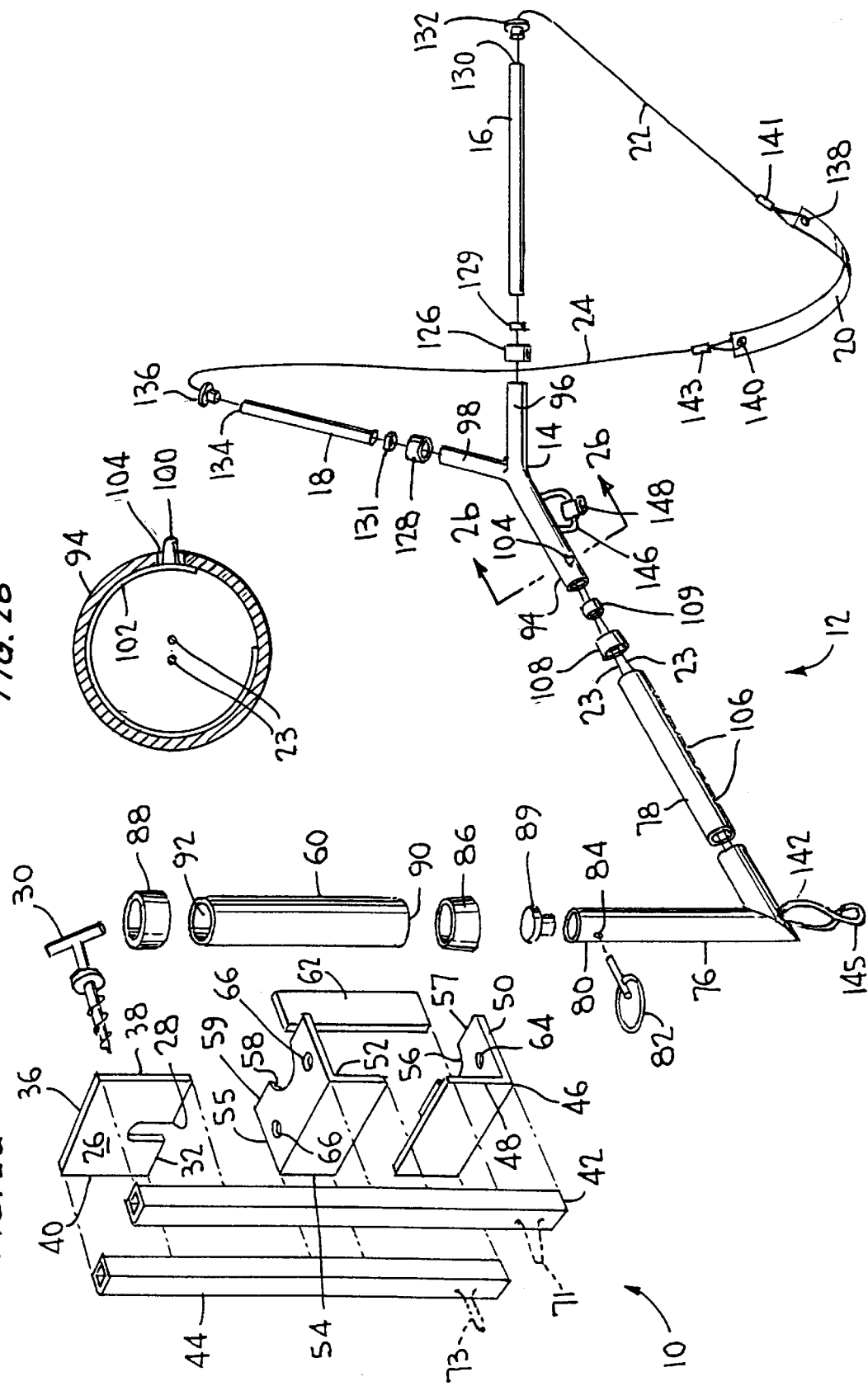
FIG. 2a is an exploded view of a hunter's shooting rest in accordance with the preferred embodiment of the present invention.
FIG. 2b is a cross-sectional view of a hunter's shooting rest in accordance with the preferred embodiment of the present invention along line 2b—2b of FIG. 2a showing the configuration of a snap button arrangement.

The preferred embodiment of a hunter's shooting rest is shown in FIGS. 1 through 4. Alternative embodiments are shown in FIGS. 5 through 8, where like features share like numbering with FIGS. 1 through 4. The shooting rests of FIGS. 1 through 4 and FIGS. 5 through 8 generally include a mounting bracket 10, an arm 12 pivotally attached thereto, and a Y-shaped connector 14, preferably, detachably connected to arm 12. The Y-shaped connector 14 has a first fork 16 and a second fork 18 detachably connected thereto and a cradle 20 suspended between first fork 16 and second fork 18 by a flexible elongated material, illustrated as first cord end 22 and a second cord end 24, respectively. The first and second cord ends, are preferably part of one continuous cord as further described below.

More particularly, as shown in FIGS. 1 through 4, mounting bracket 10 of the preferred embodiment comprises a rectangular mounting plate 26 having an opening, preferably in the form of a slot 28, centrally located therein for receiving a conventional T-screw 30. It is preferred that slot 28 is open-ended beginning at a lower edge 32 of mounting plate 26 and ending approximately at the center thereof. While slot 28 can be a centrally located closed opening through which T-screw 30 can be inserted, the open-ended nature of slot 28 allows T-screw 30 to be started into a tree 34 without holding bracket 10 to tree 34. Once T-screw 30 is inserted to a stable point, mounting bracket 10 can be slid onto T-screw 30 and T-screw 30 then tightened to firmly hold bracket 10 against tree 34 or the like. T-screw 30 is designed to be inserted through slot 28 and driven into tree 34 by hand. Mounting plate 26 can be constructed of any suitable material but aluminum is preferred.

Extending downward from the approximate upper edge 36 of mounting plate 26, and preferably squared to upper edge 36 and vertical edges 38, 40 of mounting plate 26, are a first post 42 and a second post 44, respectively. Posts 42, 44 are arranged basically parallel to each other and extend a distance beyond the lower edge 32 of mounting plate 26. Posts 42, 44 are preferably constructed of rectangular aluminum tubing and are attached to mounting plate 26 by welding or the like.

Attached to posts 42, 44 below mounting plate 26 is a lower right-angled bracket 46 having a first arm 48 and a second arm 50. First arm 48 is attached by welding or the like at one end to first post 42 and at an opposing end to second post 44. An upper right-angled bracket 52 having a first arm 54 and a second arm 55 is attached to posts 42, 44 by first arm 54 between mounting plate 26 and lower bracket 46 and aligned with lower bracket 46 as shown in FIGS. 1, 2a and 4. Centrally located in the forward facing, leading edge 57 of second arm 50 of lower bracket 46 and in the forward facing, leading edge 59 of second arm 55 of upper bracket 52 are a semi-circular lower recess 56 and a semi-circular upper recess 58, respectively. Recesses 56, 58 are adapted to receive and securely hold by welding or the like a cylinder 60 which receives arm 12. To strengthen attachment of cylinder 60 to lower and upper brackets 46, 52, a vertically oriented rectangular support plate 62 is preferably positioned between cylinder 60 and lower and upper brackets 46, 52.

Additionally, a lower pair 64 and an upper pair 66 of aligned openings are formed within second arm 50 of lower bracket 46 and second arm 55 of upper bracket 52, respectively. Each pair of openings 64, 66 is adapted for receiving ends 70 of a strap 68. Strap 68 may be any conventional strap capable of being ratcheted or cinched about a tree or the like.

To install mounting bracket 10 on tree 34, as shown in FIG. 1, mounting bracket 10 is placed against tree 34 or the like at a sufficient distance above a hunter 74 so that hunter 74 has ample clearance between himself and the shooting rest to comfortably occupy a tree stand 72, tree seat or ground blind and to hunt therefrom. Initially, T-screw 30 is either inserted through slot 28 and then driven into tree 34 thereby securing mounting bracket 10 to tree 34, or, alternatively, T-screw 30 is first partially driven into tree 34 and thereafter slot 28 is maneuvered over T-screw 30 and lowered thereon. T-screw 30 is then tightened to firmly secure the mounting bracket 10 to tree 34. Thereafter, strap 68 is placed about tree 34 and connected by ends 70 to mounting bracket 10 using either lower openings 62 or upper openings 64. Whether to use lower openings 62 or upper openings 64 depends on the configuration of tree 34. Strap 68 is then ratcheted or cinched by means known in the art so that mounting bracket 10 is tightened against tree 34. T-screw 30 in combination with strap 68 ensures a stable and secure attachment of mounting bracket 10 to tree 34. Optional pins or spikes 71, 73 can be attached to posts 42, 44, respectively, as shown in FIG. 2a to enhance or strengthen the secure attachment of the shooting rest to tree 34. Such optional spikes can be beneficial when a tree or other supporting structure is smooth, i.e. a tree missing bark. Such pins or spikes can simply be welded to the rear base of posts 42 and 44, or, alternatively, such can be screwed in place or the like.

After mounting bracket 10 is affixed to tree 34, arm 12 is pivotally connected to mounting bracket 10. However, mounting bracket 10 can also be affixed to tree 34 after arm 12 is attached to mounting bracket 10.

Figure 3:
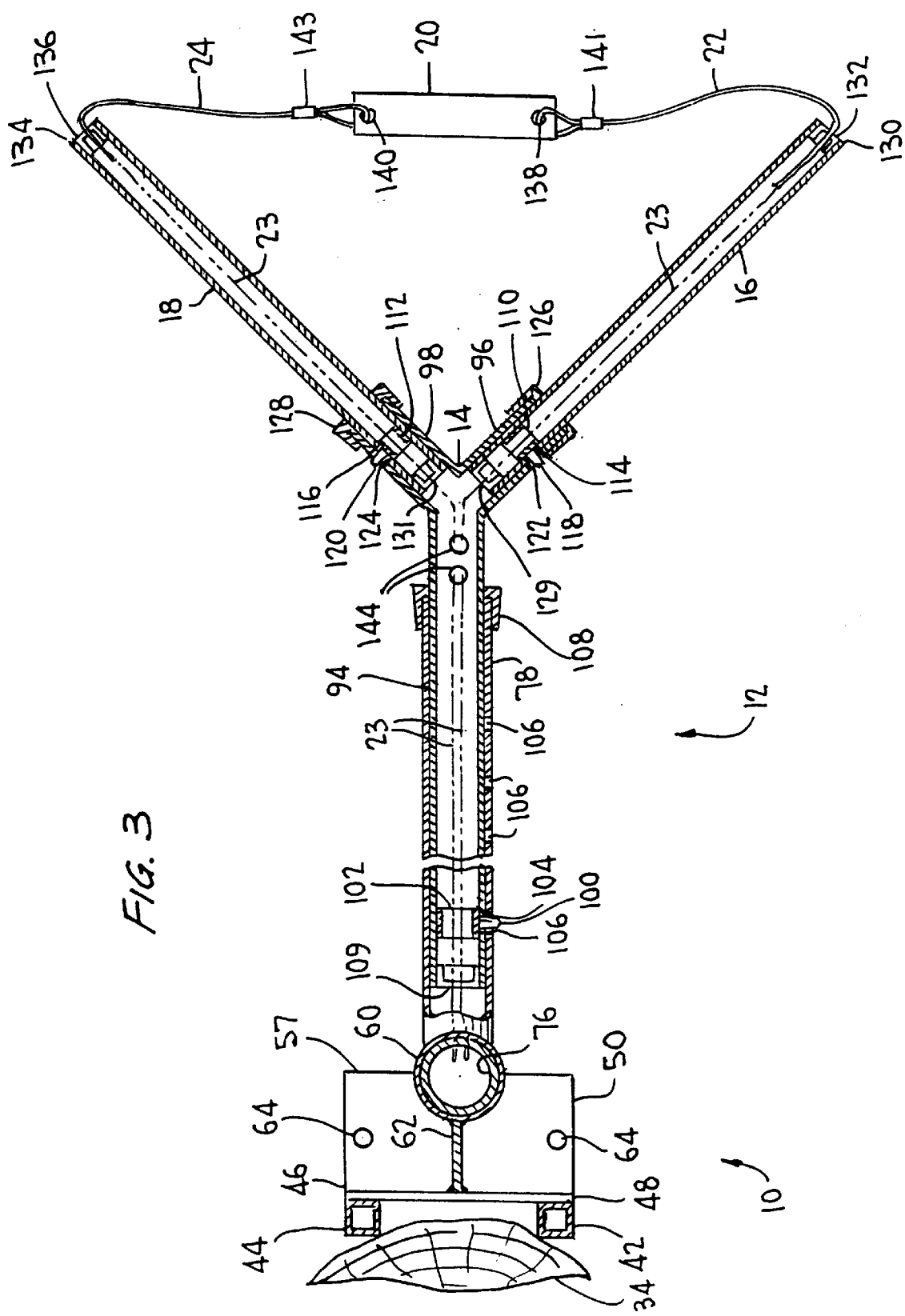
FIG. 3 is a top, cross-sectional plan view of a hunter's shooting rest in accordance with the preferred embodiment of the present invention.

Arm 12 includes a vertical member 76 and a horizontal member 78 attached thereto at a right angle. Vertical member 76 has an exterior diameter less than the interior diameter of cylinder 60 and is adapted to be inserted into cylinder 60 as shown in FIGS. 1, 3 and 4. Once inserted into cylinder 60, a free end 80 of vertical member 76 extends beyond cylinder 60 and protrudes from the top thereof. A conventional locking pin 82 is inserted through aligned holes 84 (only one hole being visible in the drawing) in free end 80 thereby securing arm 12 in mounting bracket 10. To prevent any sound which may be generated by vertical member 76 within cylinder 60 when vertical member 76 is rotated therein, it is preferred that a first silencer 86 and a second silencer 88 are arranged about the lower open end 90 and the upper open end 92 of cylinder 60, respectively, as shown in FIGS. 2a and 4. Each silencer 86, 88 has an inner diameter small enough to fit snugly about vertical member 76 while maintaining a close arrangement with cylinder 60. Thus, locking pin 82 rides along the top edge of silencer 82 when arm 12 is rotated within cylinder 60. A TEFLON™ washer can be placed between pin 82 and silencer 88 to prevent wearing of silencer 88. However, when a silencer having a sufficient thickness is utilized, it is not believed that such washer is necessary since wear would be minimal and not interfere with the intended purpose. Additionally, a plug 89 is placed into free end 80 to further decrease the chance that game might be alerted by sound generated within cylinder 60 or arm 12 or by the interaction between silencer 88 and pin 82.

Adapted to be inserted into and detachably secured within horizontal member 78 of arm 12 is Y-shaped connector 14. Y-shaped connector 14 includes a base portion 94 having an outer diameter less than the inner diameter of horizontal member 78, a first branch 96 and a second branch 98 attached to first branch 96 at an angle, preferably at a right angle. Although, a right angle is preferred as allowing maximum positional mobility while supporting a firearm as further evident from the description below, branches 96, 98 can be attached to one another to form an angle between 180 degrees, as shown in FIG. 5, and an angle greater than 0 degrees which allows for sufficient movement in use as described below. Preferably the angle formed is greater than 30 degrees.

To detachably secure Y-shaped connector 14 within horizontal member 78, base portion 94 is inserted into horizontal member 78 and a button 100 of a C-shaped snap button arrangement 102 protrudes through an opening 104 within base portion 94, as shown in FIGS. 2a, 2b and 3, into one of a series of aligned openings 106 in horizontal member 78. As shown in FIG. 2b, button 100 is elastically forced through opening 94 and subsequently through one of the series of openings 106 in horizontal member 78 using spring force generated by the relationship of snap button arrangement 102 with the inner wall of base portion 94. The force or tension generated therefrom allows button 100 to elastically protrude through opening 104 and to be easily pressed downward by hand when required for insertion or release. Accordingly, when base portion 94 is inserted into horizontal member 78, button 100 is pushed inward thereby allowing base portion 94 to slide easily therein. Series of linearly aligned openings 106 in horizontal member 78 receives and allows the decompression of button 100. Decompression of button 100 into one of the openings of the series 106, locks base portion 94 in place. Thus, the length of arm 12 can easily be adjusted to a desired length based on the spacing and position of the series of aligned openings 106 and on a hunter's preference.

To prevent any sounds which may be generated within horizontal member 78 and Y-shaped connector 14, it is preferred that a silencer 108 be placed about horizontal member 78, as shown in FIGS. 1, 2a and 3, similar to the arrangement described above involving cylinder 60 and vertical member 76. A plug 109 having two openings (not shown) therein is inserted into base portion 94 as shown at FIG. 2a to further decrease the escape of any sound which may be generated within arm 12 or Y-shaped connector 14. Additionally, such plug maintains cord 23 in non-twisted alignment when the shooting rest is broken down for storage and/or portage as further described below.

Inserted into first branch 96 and second branch 98, respectively, are first fork 16 and second fork 18. Each fork 16, 18 has an outer diameter less than the inner diameter of the respective branch 96, 98 into which it is inserted. Like the interaction between base portion 94 and horizontal member 78, forks 16, 18 are detachably secured within branches 96, 98, respectively, using a snap button arrangement. Accordingly, forks 16, 18 include a first snap button arrangement 110 and a second snap button arrangement 112, respectively, and a first opening 114 and a second opening 116, respectively, through which a respective first button 118 and a second button 120, respectively, can protrude. Similarly, each branch 96, 98 possesses a first opening 122 and a second opening 124, respectively, for receiving a respective button 118, 120. Further, branches 96, 98 include a first silencer 126 and a second silencer 128, respectively, arranged about the junction of each respective branch 96, 98 with its respective fork 16, 18 to minimize the amount of sound, if any, that may be generated while using the shooting rest. Additionally, plugs 129, 131 having a single opening (not shown) therein are inserted into forks 16, 18, respectively, to further reduce the escape of any sound generated within forks 16, 18 and Y-shaped connector 14.

It is anticipated that branches 96, 98 can be extended a distance sufficient to alleviate the need for separate detachable forks 16, 18. Furthermore, as shown in FIG. 6, it is anticipated that Y-shaped connector 14 can comprise a base portion 94 and a U-shaped portion 133 having integral members 135, 137 between which cradle 20 can be suspended. Thus, it is known that various modifications to forks 16, 18 and Y-shaped connector 14 can be made that modify the design of the preferred arm 12 while maintaining the basic function of the features of the invention, specifically, for example, a movable cradle for supporting a firearm suspended at each end thereof by a cord in arrangement with an arm.

Exiting from an outer end 130 through a plug 132 in fork 16 is first cord end 22. Exiting from an outer end 134 through a plug 136 in fork 18 is second cord end 24. Plugs 132 and 136 serve to better control movement of cord ends 22, 24 within forks 16, 18, prevent wear on cord ends 22, 24, and muffle any noise generated by movement of cord ends 22, 24 against forks 16, 18. Cord ends 22, 24 together serve to suspend cradle 20 between forks 16, 18 by attaching to cradle 20 through a first hole 138 and a second hole 140, respectively, of cradle 20. Cord ends 22, 24 can be secured to cradle 20 by any suitable means known in the art, such as by tying. However, as shown in FIGS. 1, 2a and 3 at 141, 143, it is preferred that cord ends 22, 24 be secured to cradle 20 by crimping the ends of cord ends 22, 24, respectively. Cradle 20 can be of any suitable flexible material, such as leather, textile or plastic fiber fabric material, or the like. Further, it is preferred that grommets (not shown) be placed about holes 138, 140 to strengthen the attachment of cord ends 22, 24 to cradle 20.

Cord 23 of cord ends 22, 24 runs through the single openings of plugs 132, 136 of respective forks 16, 18 before exiting forks 16, 18 through the single openings of respective plugs 129, 131; through respective branches 96, 98; into base portion 94 before exiting portion 94 through the respective openings of plug 109; and through horizontal member 78 before exiting through an opening 142 in horizontal member 78 near its intersection with vertical member 76 as portion 145. Accordingly, it is preferred that snap button arrangements 102, 110, 112 be C-shaped as shown in FIG. 2b so that cord 23 can more easily be run through base portion 94 and branches 96, 98.

When cord 23 is one piece, the U-shaped "end" portion 145 can be knotted to allow for easy grasping of cord 23 and prevent end portion 145 from being pulled inadvertently into horizontal member 78. However, it is preferred that a conventional spring cord stop (not shown) be releasably placed about portion 145 of cord 23 in order to maintain or adjust the length of each cord end 22, 24 that exits ends 130, 134. Thus, the length of cord ends 22, 24 exiting ends 130, 134 can easily be adjusted by a hunter 74 dependent on his needs. Necessarily, cord ends 22, 24 can be attached to separate cords with two free ends forming portion 145. These free ends can then be knotted or clipped together in the same manner as described above with respect to cord 23. Furthermore, a pair of openings 144 can be formed in base portion 94 to allow a central portion 146 of cord 23 to protrude out from base portion 94. A spring cord stop 148 can be placed about portion 146, as described above as to portion 145, for controlling the distance that cradle 20 is positioned from forks 16, 18. Alternatively, a second spring cord stop (not shown) can be placed about portion 146 to bolster spring cord stop 148. To increase or decrease the distance, spring cord stop 148 is simply depressed thereby allowing cord ends 22, 24 to slide freely therein. To lock the cord ends 22, 24 at a certain distance, spring cord stop 148 is allowed to decompress. The size of spring cord stop 148 is such that it cannot pass through pair of openings 144.

An alternative to running cord 23 of cord ends 22, 24 through respective forks 16, 18, is fixedly attaching cord ends 22, 24 to forks 16, 18 as shown in FIG. 7. Under such an arrangement the distance between forks 16, 18 and cradle 20 can be adjusted by having cord ends 22, 24 run through holes 138, 140, respectively, of cradle 20 before ending in a knot 149. A spring cord stop 151 is then positioned about cord ends 22, 24 between cradle 20 and knot 149. Spacing beads 153 are placed about cord ends 22, 24 between spring cord stop 151 and cradle 20 to prevent bunching of cradle 20 when spring cord stop 151 is locked on cord ends 22, 24. To adjust the distance of cradle 20 with respect to forks 16, 18, spring cord stop 151 is simply slid upward or downward along cord ends, 22, 24.

Further, an alternative embodiment to mounting bracket 10 of the preferred embodiment described above is shown in FIG. 8. Therein is illustrated an alternative mounting bracket 150 which shares like numbering with like features of the preferred embodiment as illustrated in FIGS. 1 through 4. Mounting bracket 150 includes posts 42, 44, mounting plate 26, and T-screw 30 as in the preferred embodiment. However, rather than attaching two separate mounting brackets, such as 46 and 52 in the preferred embodiment, mounting bracket 150 incorporates an I-beam-like structure 152 which is connected to posts 42, 44 as shown in FIG. 5. I-beam 152 has an upper horizontal plate 154, a lower horizontal plate 156 and a vertical plate 158 which connects lower horizontal plate 156 to upper horizontal plate 154. A hole (not shown) is formed within plate 154, and a hole is formed within plate 156 that is aligned with the hole in plate 154. Vertical member 76 of arm 12 is inserted through these holes and secured therein using locking pin 82 which is inserted through hole 84. Bushings 159, 161 are placed about the holes formed within plate 154 and plate 156, respectively, to muffle any sound generated by the movement of vertical portion 76 in horizontal plates 154, 156.

In addition to the alternative embodiment of the mounting bracket illustrated at FIG. 8, it is known that various modifications to the structure of brackets 10 and 150 can be made while providing the basic functions of these features of the invention, specifically, for example, an arm pivotally attached to a mounting bracket. Thus, mounting bracket 10 or 150 may comprise a single C-bracket (not shown) attached to posts 42, 44 in place of I-beam 152 or right angle brackets 46, 52, wherein a cylinder, or alternatively holes can be placed for receiving vertical member 76. Additionally, it is anticipated that brackets 10, 150 may comprise a block of wood or the like adapted to be secured to a tree and having therein a hole for pivotally receiving vertical member 76.

With respect to use of the invention, the device is lightweight and configured for easy portability. The device can be readily disassembled for storage in a backpack or the like. Cord 23, when the device is disassembled, maintains the broken down pieces in proper connection order so that reassembly requires minimal effort in organizing and reassembling the components. The basic components of the preferred embodiment break apart as mounting bracket 10, arm 12, Y-shaped connector 14 and forks 16 and 18. Strap 68 can be clipped to the mounting bracket and T-screw 30 can be fitted with a cord attachment for temporary attachment to a hole in bracket 46 or 52 so as to maintain all the component parts together and avoid loss by an user. The added length of cord 23 which allows adjustment of cord ends 22 and 24 allow length for disassembly of the components while maintaining them connected by means of the cord. Plug 109 as noted above also serves to prevent twisting of cord 23 so that reassembly is easy.

To use the present invention, hunter 74 rests a firearm 160 in cradle 20. To adjust aim horizontally, hunter 74 swings firearm 160 left or right as it rests in cradle 20. Swinging is enabled because of the pivotal attachment of vertical member 76 with cylinder 60. Further, there is no need for hunter 74 to directly manipulate pivot arm 12 within cylinder 60 in order to adjust aim horizontally, as the force generated by moving firearm 160 within cradle 20 is sufficient. Horizontal aiming adjustment is limited only by tree 34. For shots that are blocked by tree 34, hunter 74 can stand and rest firearm 160 on horizontal member 78. Accordingly, an optional pad 162 can be circumposed about horizontal member 78 to prevent potentially game alerting sounds and to protect the firearm.

To adjust aim vertically, a hunter swings firearm 160 in cradle 20 forward for longer shots and backward, toward hunter 74 for closer shots. Additionally, cradle 20 can be slid along the length of the barrel, receiver and/or fore-end of the stock of firearm 160 to further adjust vertical aiming. Specifically, cradle 20 is slid forward when taking longer shots and rearward, toward hunter 74, when taking shorter shots.

In addition to mounting the shooting rest to a tree or the like, a hunter can utilize the present invention while hunting in a field, isolated from upright structures sufficiently rigid to support the shooting rest. Specifically, mounting bracket 10 can be placed against the ground with arm 12 arranged essentially perpendicular thereto. Firearm 160 is rested within cradle 20 which is between forks 16 and 18. Hunter 74 thus simply steadies firearm 160 and arm 12 by the interaction of firearm 160 and his own hand with cradle 20. More particularly, by grasping cradle 20 and firearm 160 simultaneously, hunter 74 is able to maintain arm 12 in a steady and upright position while aiming at game.

The materials making up the components of the shooting rest of the invention, in particular strap 68, cord 23 and cradle 20, are selected to withstand different weather conditions while meeting their intended functions.

As will be apparent to one skilled in the art, various modifications can be made within the scope of the aforesaid description. Such modifications being within the ability of one skilled in the art form a part of the present invention and are embraced by the appended claims. For example, the arm, Y-shaped connector and forks can be one integral structure. However, it is preferred that they are as above described so as to allow break down for storage and portability. Further, it is apparent to one skilled in the art that the tree stand shooting rest can be used to support devices other than firearms, such as cameras with extended lenses and the like.

It is claimed:

1. A shooting rest comprising:
 a mounting bracket for securing said shooting rest to a structure,
 an arm comprising a first portion and a second portion, said first portion being pivotally attached to said mounting bracket and said second portion extending away from said mounting bracket,
 a branched connector attached to an end of said second portion of said arm opposite said mounting bracket, said branched connector having a base portion, a first branch and a second branch, and said second portion of said arm and said branched connector extending in use in a common horizontal plane,
 a first fork member attached to said first branch,
 a second fork member attached to said second branch, and
 a cradle suspended between said first fork member and said second fork member,
 wherein said mounting bracket comprises an upper portion having an opening for receiving a screw for attaching said mounting bracket to a structure, a lower portion for engaging said arm and a back portion connecting said upper portion to said lower portion.

2. A shooting rest in accordance with claim 1 wherein said lower portion comprises a first horizontal platform extended from said back portion, and a second horizontal platform extended from said back portion.

3. A shooting rest in accordance with claim 2 wherein said lower portion comprises a vertical plate aligned with said back portion and extended between said first platform and said second platform, wherein said first platform and said second platform each includes an aperture for receiving said arm.

4. A shooting rest in accordance with claim 2 wherein said lower portion comprises a vertical plate aligned with said back portion and extended between said first platform and said second platform, wherein a cylinder for receiving said arm is affixed to said first platform and said second platform.

5. A shooting rest in accordance with claim 4 wherein a first silencer is located about an upper edge of said cylinder and a second silencer is located about a lower edge of said cylinder.

6. A shooting rest comprising:
 a mounting bracket for securing said shooting rest to a structure,
 an arm comprising a first portion and a second portion, said first portion being pivotally attached to said mounting bracket and said second portion extending away from said mounting bracket,
 a branched connector attached to an end of said second portion of said arm opposite said mounting bracket, said branched connector having a base portion, a first branch and a second branch, and said second portion of said arm and said branched connector extending in use in a common horizontal plane, a first fork member attached to said first branch, a second fork member attached to said second branch, and a cradle suspended between said first fork member and said second fork member, wherein said base portion can telescope out from or into said arm or said arm can telescope out from or into said base portion.

7. A shooting rest comprising:

a mounting bracket for securing said shooting rest to a structure, an arm comprising a first portion and a second portion, said first portion being pivotally attached to said mounting bracket and said second portion extending away from said mounting bracket, a branched connector attached to an end of said second portion of said arm opposite said mounting bracket, said branched connector having a base portion, a first branch and a second branch, and said second portion of said arm and said branched connector extending in use in a common horizontal plane, a first fork member attached to said first branch, a second fork member attached to said second branch, and a cradle suspended between said first fork member and said second fork member, wherein said first fork member and said first branch are removably adjoined using a snap button arrangement and said second fork member and said second branch are removably adjoined using a snap button arrangement.

8. A shooting rest comprising:

a mounting bracket for securing said shooting rest to a structure, an arm pivotally attached to said mounting bracket, said arm forming a branched support at an end opposite said bracket, said branched support having a first fork member and a second fork member, and a cradle suspended between said first fork member and said second fork member, wherein said cradle is suspended by a first cord end and at an opposite end by a second cord end, said first cord end associated at an end opposite said cradle to said first fork member and said second cord end associated at an end opposite said cradle to said second fork member, wherein said first fork member includes a first opening, said second fork member includes a second opening, and said arm includes a third opening and a passageway connecting said first opening and said second opening to said third opening, and wherein said first cord end passes through said first opening into said passageway and through said third opening, and said second cord end passes through said second opening into said passageway and through said third opening.

9. A shooting rest comprising:

a mounting bracket for securing said shooting rest to a structure, an arm pivotally attached to said mounting bracket, a branched connector attached to an end of said arm opposite said mounting bracket, said branched connector having a base portion, a first branch and a second branch, a first fork member attached to said first branch, a second fork member attached to said second branch, and a cradle suspended between said first fork member and said second fork member, wherein said cradle is suspended by a first cord end and at an opposite end by a second cord end, said first cord end associated at an end opposite said cradle to said first fork member and said second cord end associated at an end opposite said cradle to said second fork member, wherein said first fork member includes a first opening, said second fork member includes a second opening, and said base portion includes a third opening and a passageway connecting said first opening and said second opening to said third opening, and wherein said first cord end passes through said first opening into said passageway and through said third opening, and said second cord end passes through said second opening into said passageway and through said third opening.

* * * * *